US012354439B2

(12) United States Patent
Warner et al.

(10) Patent No.: US 12,354,439 B2
(45) Date of Patent: Jul. 8, 2025

(54) ENABLING FINANCIAL TRANSACTIONS FOR ELECTRONIC GAMING MACHINES

(71) Applicant: AUTOMATED CASHLESS SYSTEMS, INC., Reno, NV (US)

(72) Inventors: Stephen L. Warner, Zephyr Cove, NV (US); Michael Sackrison, Reno, NV (US); Shawn G. Quick, Reno, NV (US); Michael Daly, Las Vegas, NV (US)

(73) Assignee: Automated Cashless Systems, Inc., Reno, NV (US)

( * ) Notice: Subject to any disclaimer, the term of this patent is extended or adjusted under 35 U.S.C. 154(b) by 81 days.

(21) Appl. No.: 17/985,807

(22) Filed: Nov. 11, 2022

(65) Prior Publication Data

US 2023/0230449 A1 Jul. 20, 2023

Related U.S. Application Data

(63) Continuation of application No. 17/187,333, filed on Feb. 26, 2021, now Pat. No. 11,508,213, which is a continuation of application No. 16/677,399, filed on Nov. 7, 2019, now Pat. No. 11,282,337.

(51) Int. Cl.
*G07F 17/32* (2006.01)

(52) U.S. Cl.
CPC ...... *G07F 17/3244* (2013.01); *G07F 17/3223* (2013.01); *G07F 17/3241* (2013.01)

(58) Field of Classification Search
CPC ............ G07F 17/3234; G07F 17/3241; G07F 17/3244; G07F 17/3223; G07F 17/3225; G07F 17/3232
See application file for complete search history.

(56) References Cited

U.S. PATENT DOCUMENTS

| | | | |
|---|---|---|---|
| 5,759,103 | A | 6/1998 | Freels et al. |
| 6,098,053 | A | 8/2000 | Slater |
| 6,251,014 | B1 | 6/2001 | Stockdale et al. |
| 7,780,526 | B2 | 8/2010 | Nguyen et al. |
| 7,844,255 | B2 | 11/2010 | Petrov et al. |
| 8,306,879 | B2 | 11/2012 | Nonaka |
| 8,452,702 | B1 | 5/2013 | O'Donnell et al. |
| 8,876,594 | B2 | 11/2014 | Holch et al. |
| 8,977,680 | B2 | 3/2015 | Gibson et al. |

(Continued)

*Primary Examiner* — David L Lewis
*Assistant Examiner* — Matthew D Hoel
(74) *Attorney, Agent, or Firm* — Kerr IP Group, LLC

(57) ABSTRACT

A gaming system enabling financial transactions for an electronic gaming machine, or a plurality of electronic gaming machines is described. The gaming system includes an electronic gaming machine processor, a database, and a master gateway. The electronic gaming machine processor is associated with the electronic gaming machine. The database includes data for each financial transaction, the database including a financial transaction identification, a cardholder name, and a transaction value. The master gateway includes at least one of a problem gaming limit and a gaming rule set. The master gateway determines that the financial transaction complies with at least one of the problem gaming limit and the gaming rule set. The master gateway processes compliant financial transactions and rejects non-compliant financial transactions.

16 Claims, 7 Drawing Sheets

(56) References Cited

U.S. PATENT DOCUMENTS 9,171,303 B2 10/2015 Potts et al.
9,830,772 B2 11/2017 Reaves et al.
2002/0183110 A1 12/2002 Flanagan-Parks et al.
2003/0073494 A1 4/2003 Kalpakian et al.
2005/0065876 A1 3/2005 Kumar
2005/0107155 A1 5/2005 Potts et al.
2005/0266919 A1 12/2005 Rowe et al.
2006/0218091 A1 9/2006 Choy
2007/0225068 A1* 9/2007 Weiss .................. G07F 17/3225 463/25
2007/0246531 A1* 10/2007 Dabrowski ......... G07F 17/3248 235/379
2007/0282858 A1* 12/2007 Arner ...................... H04L 67/02
2008/0015014 A1* 1/2008 Weiss .................. G07F 17/3255 463/25
2008/0076506 A1 3/2008 Nguyen et al.
2008/0113776 A1* 5/2008 Sommer ................. G07F 17/32 463/25
2008/0119284 A1* 5/2008 Luciano .............. G07F 17/3248 463/25
2008/0139303 A1* 6/2008 Patterson ............... G06Q 30/02 463/25
2008/0153583 A1* 6/2008 Huntley .............. G07F 17/3281 463/25
2008/0242403 A1* 10/2008 Weiss .................. G07F 17/3255 463/43
2009/0005157 A1* 1/2009 Netley ................ G07F 17/3251 463/25
2009/0005159 A1* 1/2009 Netley ................ G07F 17/3251 463/25
2009/0099965 A1* 4/2009 Grant, IV .......... G06Q 20/3433 705/41
2009/0131146 A1* 5/2009 Arezina .................. G07F 17/32 463/20
2009/0138369 A1* 5/2009 Raja ....................... G06Q 20/34 705/26.1
2009/0239656 A1 9/2009 Meyerhofer et al.
2009/0287524 A1* 11/2009 Gnoato .................. G06Q 20/10 705/26.1
2009/0291755 A1* 11/2009 Walker ................ G07F 17/3262 463/29
2009/0299848 A1* 12/2009 Cao .................... G06Q 30/0207 705/14.1
2009/0305765 A1* 12/2009 Walker .................... G07F 17/34 463/43
2010/0062834 A1* 3/2010 Ryan ....................... G07F 17/32 463/43
2010/0130284 A1* 5/2010 Luciano, Jr. ........ G07F 17/3244 463/25
2010/0197383 A1* 8/2010 Rader ................. G07F 17/3251 463/43
2010/0222132 A1* 9/2010 Sanford ................. G06Q 20/18 463/25
2011/0086696 A1* 4/2011 MacEwan ............... G07F 17/32 463/43
2011/0230260 A1* 9/2011 Morrow .............. G07F 17/3213 463/30
2011/0250972 A1* 10/2011 Horbay .................. G06Q 10/10 463/42
2011/0263318 A1* 10/2011 Agarwal ............... G07F 17/323 463/25
2012/0142403 A1* 6/2012 Prather .................. G06Q 50/34 463/19
2012/0144461 A1* 6/2012 Rathbun ............ G06Q 20/4014 726/5
2012/0258795 A1* 10/2012 Ryan ................... G07F 17/3206 463/29
2013/0172078 A1* 7/2013 Boyd ...................... G07F 17/32 463/29
2014/0094256 A1* 4/2014 Hilbert .................... G07F 17/34 463/20
2014/0194193 A1* 7/2014 Warner .................. G06Q 20/10 463/25
2014/0194194 A1* 7/2014 Warner ............... G07F 17/3244 463/25
2014/0194195 A1* 7/2014 Warner .................. G06Q 50/34 463/25
2014/0200073 A1* 7/2014 Warner .................. G06Q 50/34 463/25
2015/0148120 A1* 5/2015 Warner ............. G06Q 20/1085 463/25
2015/0187177 A1* 7/2015 Warner ............... G07F 17/3244 463/25
2015/0339654 A1* 11/2015 Warner ................... G07F 17/42 463/25
2016/0027252 A1* 1/2016 Warner ............... G07F 17/3244 463/25

* cited by examiner

ENABLING FINANCIAL TRANSACTIONS FOR ELECTRONIC GAMING MACHINES

CROSS REFERENCE

This patent application is a Continuation of patent application Ser. No. 17/187,333 entitled FINANCIAL TRANSACTIONS FOR ELECTRONIC GAMING DEVICES filed on Feb. 26, 2021;

which patent application is a Continuation of patent application Ser. No. 16/677,399 entitled ENABLING FINANCIAL TRANSACTIONS FOR ELECTRONIC GAMING MACHINES filed on Nov. 17, 2019;

which is a Continuation-In-Part of patent application Ser. No. 15/212,020 entitled FINANCIAL TRANSACTIONAL GATEWAY SYSTEMS AND METHODS filed on Jul. 15, 2016; and all the patent applications identified above are incorporated by reference in this patent application filing.

FIELD

The present disclosure relates to client devices, systems and methods that enable financial transactions for electronic gaming machines. More specifically, the client devices, systems and methods allow a gaming patron to utilize their payment device located at the gaming machine.

BACKGROUND

In everyday retail POS transactions, a merchant uses software that automatically transmits an authorization request to a credit or debit card processor which routes that request to the proper banking network. Because the banks essentially own the cards that the consumer uses, the banks then make a decision based on various factors relating to the transaction, such as amount, location, and/or daily limits to make a decision on whether the transaction request is approved or denied. In some cases, even an 'overdraft' is allowed because the bank deems the customer credit worthy and will approve the transaction even though the customer's account will become overdrawn. Typically, this also results in an overdraft fee charged to the customer.

Most casinos provide automated teller machines (ATM) and cash kiosks for the convenience of their patrons. Currently, Automated Cash Systems, Inc. (ACS) has extended the reach of ATMs and kiosks to table games and slot machines. More specifically, ACS provides a point-of-sale (POS) personal identification number (PIN) debit fund processing system for gaming patrons at table games and slot machines. The ACS system provides a secure system that allows gaming patrons to initiate and complete an electronic transfer of funds from a bank or credit account entirely at the point of game play.

In the casino gaming space, there are many additional and varying regulations regarding all matters related to the operation of casinos, and the manufacture of devices used in casinos. These regulations are necessary in order to protect the consumer, the casinos and the reputation of the industry.

With respect to customer, there are the challenges associated with "problem gaming." Problem gaming may be referred to as a psychological condition, impulse disorder or simply an addiction. There are an estimated 1%-2% of those players that gamble that actually have a gaming problem as reported by the "National Center for Responsible Gaming" (NCRG).

Regulations also vary across the country and the world, as there is no Federal or international regulation of the casino gaming space outside of online gaming. In the United States, each state is responsible for its own gaming regulations. Although many states have similar requirements, there are many differences in what those regulations allow, what devices may be used, and how those devices can be used. Further complicating the issue is the concept of the 'sovereign nation' status granted to Native American tribes by the Federal government that allows the tribes to regulate their own casinos within each state. This provides a greater number of bodies creating and enforcing casino gaming regulations.

Standard off the shelf Point of Sale hardware and software have only been designed to meet banking requirements.

In addition, casinos for many years, have allowed ATM machines on-site that allow a customer to withdraw funds from his/her credit or debit card account. These machines provide no 'gaming regulatory' inspection or decision-making to obtain an approval. The machines simply provide cash if the customer's bank approves the transaction.

Thus, there is a need for a simplified method for a gaming patron to utilize their own instrument in a payment device located proximate to an electronic gaming machine, which can easily integrate with existing legacy casino gaming systems and meet the stringent security and regulatory requirements for casino gaming.

SUMMARY

A gaming system enabling financial transactions for an electronic gaming machine, or a plurality of electronic gaming machines is described. The gaming system includes an electronic gaming machine processor, a database, and a master gateway. The electronic gaming machine processor is associated with the electronic gaming machine. The database includes data for each financial transaction, the database including a financial transaction identification, a cardholder name, and a transaction value. The master gateway includes at least one of a problem gaming limit and a gaming rule set. The master gateway determines that the financial transaction complies with at least one of the problem gaming limit and the gaming rule set. The master gateway processes compliant financial transactions and rejects non-compliant financial transactions.

In one illustrative embodiment, the gaming system further comprises a slot cabinet that houses the electronic gaming machine processor and a controller. In a further illustrative embodiment, the gaming system includes a Point-of-Sale (POS) terminal communicatively coupled to the controller. The POS terminal receives an amount of monetary funds to transfer from a financial account to the client device and the POS terminal communicates the amount of the monetary funds to the controller. In an even further illustrative embodiment, the gaming system includes a wireless communications module communicatively coupled to the controller, an aggregator communicatively coupled to the wireless communications module and a plurality of separate wireless communications modules, in which each separate wireless communications module is associated with a separate client device, a backend server communicatively coupled to the aggregator, in which the wireless communications module communicates the amount of monetary funds to the backend server. In a still further embodiment, the plurality of wireless communications modules enable communications with at least one other wireless communication module over short distances using point to point or broadcast packets that allow for bi-directional data transmission between each client device located on a casino gaming floor, and allow each client device to send and receive data through radio transmissions sent from an out of range client device through a series of data rebroadcasts from at least one wireless communications module that is communicatively coupled to each out of range client device.

In another illustrative embodiment, the master gateway includes at least one of a tribal rule, a state gambling rule, a federal gaming rule, and a casino property rule. In a further illustrative embodiment, a backend server receives an approved transaction instruction, at least one of the backend server and a casino management system provides a voucher validation code, and the backend server wirelessly communicates the voucher validation code to the controller. In an even further illustrative embodiment, the master gateway determines that the financial transaction complies with at least one of the problem gaming limit and the gaming rule set. In an even further embodiment, the casino management system is communicatively coupled to the backend server, the casino management system includes a voucher redemption system, and the voucher validation code is communicated from the backend server to the casino management system.

FIGURES

The present invention will be more fully understood by reference to the following drawings which are presented for illustrative, not limiting, purposes.

DESCRIPTION

Figure 1:
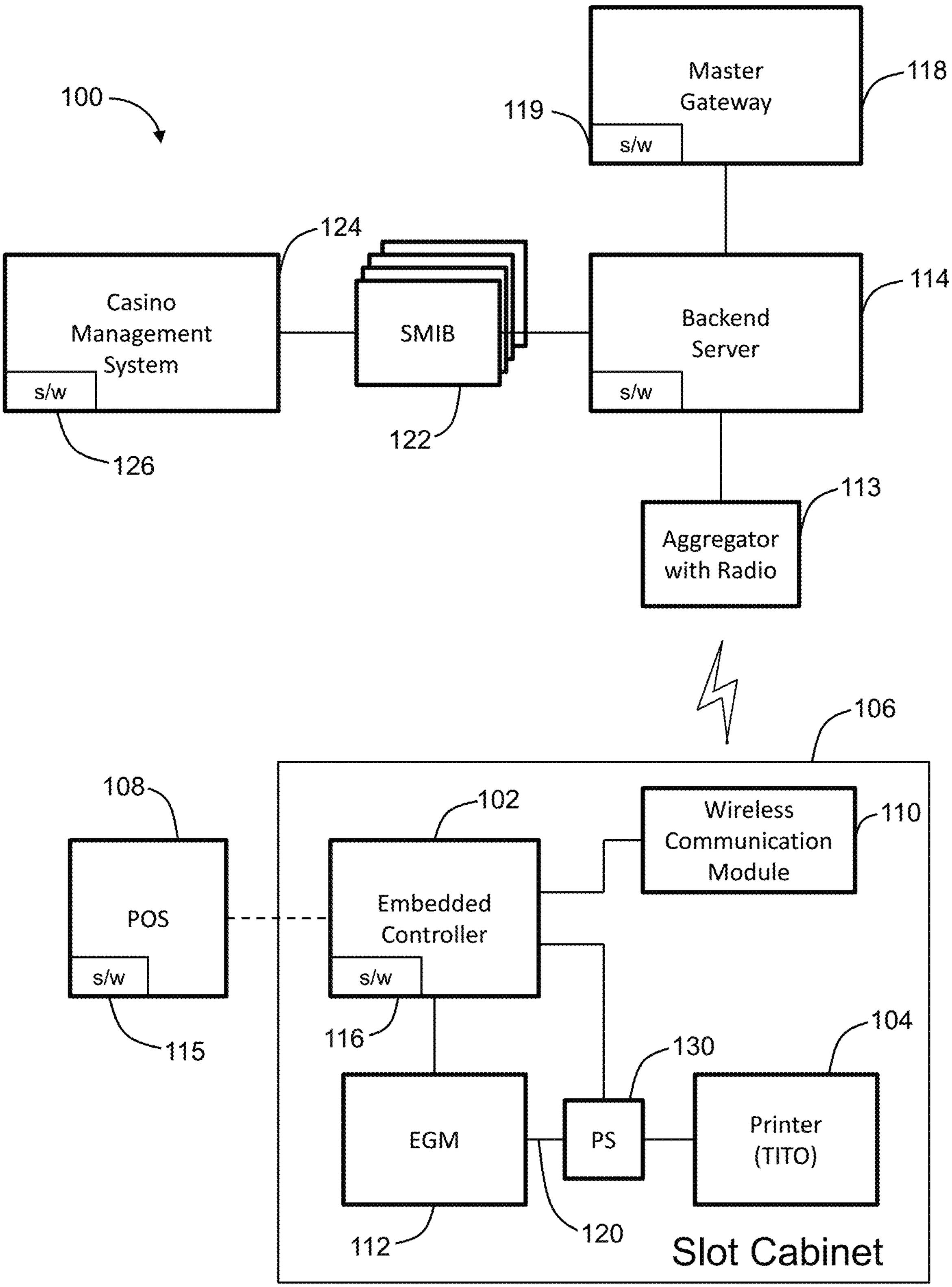
FIG. 1 shows an illustrative transactional system.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and methods described herein may vary as to configuration and as to details. The following detailed description of the illustrative embodiments includes reference to the accompanying drawings, which form a part of this application. The drawings show, by way of illustration, specific embodiments in which the invention may be practiced. It is to be understood that other embodiments may be utilized and structural changes may be made without departing from the scope of the claims.

The client devices, systems and methods presented herein allow a gaming patron to utilize their own instrument in a payment device located at an electronic gaming machine. Using Payment Card Industry (PCI) certified technology, the transaction is routed to the banking networks and a Ticket-In-Ticket-Out (TITO) ticket is printed using the printer already located at the game. The patron is then able to insert this ticket into the bill validator and an equivalent number of credits will be placed on the game register. Alternatively, the patron can choose to redeem this ticket for cash at any of the pre-existing redemption outlets.

The client devices, systems and methods described herein use a proprietary financial network to route all transactions on the casino floor to a single backend server. The backend server has connections to both the banking and processing networks and also to the Casino's Accounting and Management Software Infrastructure (CMS). The CMS uses proprietary protocols and thus cannot be directly accessed by the backend server. In the illustrative embodiments presented herein, a Slot Machine Interface Board (SMIB) is used to format the data into a usable fashion for the CMS.

At least one benefit of the client devices, systems and methods presented herein is that only a small number of SMIBs will be required to interface with the CMS, even though client devices on the casino floor can be substantially higher, e.g. over 1000 client devices.

In order to provide a product that allows a gaming patron to use a financial instrument, such as a payment card (credit, debit, prepaid, or other method of transferring money), at a gaming device, a vendor must provide protections to the regulatory bodies, the casinos, and the patron that the process is safe and secure, and provide complete accounting, privacy, verification and meet all casino and banking regulatory requirements.

In the illustrative embodiment, the transactional systems and methods presented herein initiate, process and complete an electronic funds transaction (EFT) or something similar in a commercial environment. The transactional systems and methods may be used as a substitute for an automated teller machine (ATM), cash kiosk, or other such facility capable of completing the desired transaction. The transactional systems and methods are relatively small and portable, so the transactional client devices and systems may be easily relocated.

In the illustrative embodiment, the transactional systems and methods operate at a slot machine, which is also referred to interchangeably as an Electronic Gaming Machine (EGM). In the illustrative embodiment, the transactional system and method does not dispense cash, like a typical ATM. In another embodiment, the transactional system and method dispenses other indicia of value, e.g. loyalty points or gift cards.

The transactional system and method may be easily relocated, e.g. to a patron's point-of-play, thereby facilitating game play. Additionally, the transactional system and method eliminates the need to restock an unattended ATM machine with cash. Furthermore, the transactional client device, system and method operates with fewer complex mechanical components than an ATM.

The term "indicia of value" as used herein includes an electronic record, a printed record and a physical token that has a relative worth, i.e. value, to the end user, e.g. customer or patron, and the business or property, e.g. casino. In other words, an electronic record may operate as an indicia of value. Additionally, a printed record may also operate as an indicia of value.

The indicia of value has a relative worth to the business or property, e.g. casino, and the end user, e.g. patron, in the transactional system and method for a game that is presented herein.

An "electronic record operating as an indicia of value" is an electronic record that has relative worth to the end user and the business or property. There are a variety of secure communications that communicate an electronic record operating as an indicia of value in the transactional system and method for a game.

An illustrative electronic record operating as an indicia of value includes the electronic record received from the POS device, which securely communicates the electronic record to the controller. The controller then proceeds to transmit the electronic record operating as an indicia of value to the gateway, which further communicates the electronic record to the financial network or payment processor.

The controller then receives an authorization response from the gateway. The authorization response is another electronic record operating as an indicia of value.

The controller proceeds to transmit the authorization response to the POS device. Again, the transmitted authorization response is an electronic record operating as an indicia of value.

An optional "receipt" for the approved transaction is presented at the electronic gaming machine. A receipt, i.e. payment record, provides a printed record that a payment was received by the business or property, e.g. casino, from the end user, e.g. patron. However, the receipt is not an electronic record and does not have relative worth. In other words, the receipt is a printed record that does not have an indicia of value.

An "electronic record" (by itself) provides electronic or digital evidence that a business activity or transaction took place at a particular time. The electronic record is captured through an electronic or digital process. An electronic record includes a records management solution, which controls the creation, distribution, use, maintenance and disposition of recorded information that is maintained as evidence of business activities or business transactions.

Thus, an electronic record operating as an indicia of value is a subset of an electronic record.

An "electronic record" may include other database attributes that are not specific to the electronic record operating as an indicia of value such as player loyalty information or accumulated loyalty points or player preferences and other such electronic records that do not correspond to an indicia of value.

A "printed record operating as an indicia of value" is a printed record that has relative worth to the end user and the business or property utilizing the transactional system and method presented herein. A TITO Ticket is an example of this.

In general, a "voucher" is a printed documents that have an indicia of value, which may be exchanged for goods, services, casino chips or any other indicia of value.

A "coupon" entitles the holder of the coupon to a discount for a particular product. A coupon is a type of voucher.

In gaming, the definition of a voucher is more granular because there are a variety of different vouchers including a complete voucher, a duplicate voucher, an incomplete voucher and replacement voucher. A "complete voucher" (in gaming) contains, at a minimum, a complete validation number and is of a quality that can be redeemed through the use of an automated reader or scanner. A "duplicate voucher" is any reprinted complete voucher or incomplete voucher. An "incomplete voucher" contains, at a minimum, the voucher validation number printed across the printed leading edge and is manually redeemable, but is not of a quality that can be redeemed through the use of an automated reader or scanner. A "replacement voucher" is printed following a failed attempt to print a complete or incomplete voucher.

An illustrative voucher system includes, but is not limited to, a Ticket In Ticket Out (TITO) system. A TITO ticket is an illustrative complete voucher that can be redeemed through the use of automated reader or scanner.

A "physical token operating as an indicia of value" is a physical token that has relative worth to the end user and the business or property. By way of example and not of limitation, casino chips, poker chips and gift cards are illustrative physical tokens operating as an indicia of value.

A "payment gateway" is also referred to interchangeably as the "banking gateway" and "financial gateway." The payment gateway is configured to communicate with at least one financial network or payment processor. Additionally, the payment gateway is configured to receive an authorization request, which is associated with an approved transaction.

A "gaming gateway" is configured to manage and perform the regulatory requirements associated with gaming or gambling. By way of example and not of limitation, the gaming gateway may include problem gaming limits and problem gaming rule sets. Illustrative problem gaming rule sets may include daily limits or may pause the period during which a person may withdraw funds to allow for a "cool down" period. Additionally, the gaming gateway may be configured to communicate with a regulatory gateway that includes a variety of rule sets such as tribal rules, state gambling rules, federal gaming rules, casino property gaming rules and other such gaming or "gambling" rule sets. Gaming is used to refer to gambling.

For purposes of this patent, reference is also made to a master gateway 118, which includes the payment gateway and the gaming gateway.

Referring to FIG. 1 there is shown an illustrative transactional system 100. The transactional system 100 includes an embedded controller 102 that is communicatively coupled to a printer sharing board 130 which is communicatively coupled to a printer 104, which are all housed within a slot cabinet 106. By way of example and not of limitation, a hard wire connection is made between an embedded controller 102 and a dedicated printer 104, which generates a printed record operating as an indicia of value. The combination of the embedded controller 102 and printer 104 is housed in the slot cabinet 106.

The embedded controller 102 is configured to receive encrypted data from a POS client device 108 and communicates the encrypted data to a wireless communication module 110. The embedded controller 102 controls the authorization of the components of the system 100, which allows a specific local device to automatically and securely connect to the wireless mesh network without requiring credentials and passwords that further require human intervention. The embedded controller 102 may also be configured to add one or more additional layers of encryption above and beyond the tokenized information received from the POS device 108.

The embedded controller 102 is also communicatively coupled to wireless communication module 110. The illustrative wireless communications module 110 uses IEEE 802.15 wireless communication protocols to send data from the embedded controller to an aggregator 113 located at various points inside of the casino. As described in further detail below, the wireless communications module 110 also communicates incoming data transmissions containing authorization and voucher validation information. The wireless communication module 110 may also be configured to provide broadcast and point-to-point transmissions, and forwards packets not intended for embedded controller 102, but which are intended for multi-hop transmissions to other embedded controllers (not shown).

In the illustrative embodiment, the slot cabinet 106 houses the embedded controller 102, the wireless communication module 110, the printer 104 and Electronic Gaming Machine (EGM) 112, which is also referred to as a "slot machine." The slot machine cabinet 106 refers to the housing which includes various modules such as the embedded controller 102. The EGM Controller 112 includes a central processing unit of a game which is associated with the slot machine. Additionally, the EGM 112 controls the printing of tickets and the generation of voucher validation codes for slot machine generated tickets, e.g. TITO tickets.

The embedded controller 102 is also configured to communicate with a printer sharing board 130 through the sending of a logic request signal. The printer sharing board 130 monitors the communications between the EGM 112 and the TITO printer 104, which allows the printer sharing board 130 to re-route the EGM 112/TITO printer 104 connection 120 when the embedded controller 102 receives an instruction to print the illustrative PlayOn[SM] voucher. The connection 120 is only broken when there is no data communication occurring between the EGM 112 and the TITO printer 104. The printer sharing board 130 utilizes fail-closed technology to ensure that if the embedded controller 102, the POS device 108 and the wireless communications module 110 are individually or collectively not working, then the connection 120 between the EGM 112 and the TITO printer 104 will be in place and allow the slot machine 112 to function normally and communicate with TITO printer 104. Additionally, the printer sharing board 130 provides logic which allows the embedded controller 102 to exchange data with the EGM controller 112 and/or the printer 104 when connection 120 is open. This is a key element for universal compatibility because it prevents the EGM from detecting loss of communication with the printer.

The print sharing module includes a logic module that monitors data communications between the electronic gaming machine processor and the printer. The controller is electrically coupled to the printer sharing module. The controller is configured to generate a request signal that is communicated to the printer sharing module that re-routes the communication between the electronic gaming machine processor and the printer. The printer sharing board reroutes the communications between the electronic gaming machine processor and the printer and allows the printer sharing board to communicate with the printer.

By way of example and not of limitation, the embedded controller 102 may be embodied as an ARM based embedded controller with connectivity to the printer 104 as required by the printer manufacturer. In general, the printer 104 may be a thermal printer that is used to print vouchers in a gaming environment. The illustrative printer 104 may be an Ithaca 950 printer that has a hardwire connection to the printer sharing board 130.

In the illustrative embodiment, the embedded controller 102 includes a central processing unit ("CPU"), at least one static or random access memories and at least one port that permits connection of one or more external memories or data storage devices. For illustrative purposes, the CPU may include an ARM-based microcontroller, RISC microcontroller, or other such microcontroller suitable for the intended purpose.

The illustrative embedded controller 102 comprises one or more local device and network connectivity modules for communication using wired, wireless, near-field communications (NFC), other electromagnetic, fiber optic, other optical, or other communication means and/or protocols, including but not limited to USB), the proprietary Standard Peripheral Communication ("SPC") protocol used in certain gaming devices, RS-232, RS-422, RS-485, IEEE 1394, wired Ethernet, Wi-Fi, 802.1 (x)(y) compliant methods, Bluetooth™, infrared, optical, radio frequency, CDMA, GSM, GPRS, satellite, and the like. The network communication modules may include one or more ports enabled and associated with the network communication modules. The embedded controller may be configured to provide multiple ports that are simultaneously active using different protocols, multiple instances of the same protocol, or any combination thereof.

In the illustrative embodiment, the slot cabinet housing 106 provides a single enclosure or housing that includes the embedded controller 102 that is communicatively coupled to a dedicated printer 104 via the printer sharing board 130. The printer sharing board 130 and printer 104 communicate via a local communication protocol such as, but not limited to, RS-232, USB(X).(Y), SPC, RS-422, RS-485, IEEE 1394, or the like. By way of example and not of limitation, a protocol conversion interface or controller board may be utilized between the printer sharing board 130 and the dedicated printer 104 to establish a data communication path between the two devices utilizing available or desired ports in each one. The dedicated printer includes any device suitable for generating a printed record operating as an indicia of value.

The illustrative embedded controller 102 and the dedicated printer 104 operate directly from conventional 120 V AC power. One or more transformers, power supplies, power converters, or any suitable combination thereof are supplied and configured between the devices and the source of 120 V AC power to provide power to the two devices with the required voltage and current availability for proper operation. Such combination of transformers, power supplies, and power converters may provide regulated or unregulated power to the devices.

The illustrative POS client device 108 includes custom software that allows a patron to enter transaction details such as amount and provide fee approval. Additionally, the illustrative POS client device 108 can support receiving a magstripe card swipe, an EMV card with a smart card and other such cards or NFC type device. The POS client device 108 also encrypts the transaction details for transmission to the master gateway 118. The POS client device 108 is configured to also display authorization or decline information after it is received from the master gateway 118. In the illustrative embodiment, the POS device 108 is injected with a set of keys specific to the banking processor at a third party injection site, which allows the user's financial data to be tokenized upon entry and only decoded by the processor.

The embedded controller 102, the dedicated printer 104, or the combination thereof operate for a limited time period utilizing a source of stored energy, such as an uninterruptable power supply ("UPS"), other battery configuration, charged capacitive storage device, or the like. Such stored energy devices charge automatically from an 120 V AC power source when such power is available, but in the event of any interruption in such source, either or both device(s) continue to operate for a limited period of time using the stored energy. This is particularly advantageous to permit completion of any EFT in process at the time of an interruption in the commercial power service or if the subsystem should become inadvertently disconnected from AC power.

The embedded controller 102 is also communicatively coupled to a POS device. In the illustrative embodiment, the device is a Point of Sale (POS) terminal 108 or an Electronic Funds Transfer (EFT) terminal 108 that uses a wired or wireless connection such as an IEEE 802.11 (WiFi), IEEE 802.15 (Bluetooth/Zigbee) or other such wireless communication standard. Note, the terms POS and EFT are used interchangeably for purposes of this patent.

The process of generating a secure communication between the embedded controller 102 and the POS terminal 108 is performed by a software module 115 communicating with an embedded controller software module 116. In the illustrative embodiment, the POS software module 115 is configured to present the illustrative end user, e.g. casino patron, with user instructions.

More specifically, the illustrative POS terminal 108 is a YouTransactor SK100 which includes a PCI certified PIN pad, an NFC contactless solution, an LCD display, an EMV card reader and a mag stripe card reader. The EMV card reader is compatible with the EMV global standard for authentication of credit and debit card transactions. The POS terminal 108 may also include a payment card industry (PCI) and pin entry device (PED) certified device.

The YouTransactor SK100 or other such compatible device includes proprietary software 115 The pre-encrypted data sent between the custom software application or comparable application running on the POS terminal 108 and the custom proprietary software application 116 running on the embedded controller may be encoded using a proprietary format. Even if the encryption of the data is broken, the plaintext format of the data will still be unknown. Alternative devices are configured to provide similar functionality as the custom software application with a combination of firmware and software that operates on a device configured to perform the functions presented herein.

More generally, the POS device 108 may comprise a central processing unit ("CPU"), one or more static or random access memories, and one or more ports to permit connection of one or more external memory or data storage devices. The device may further include a point-of-sale (POS) personal identification number (PIN) entry keypad and one or more displays or display devices. The device may include a payment card reader that may be a smart card reader, a magnetic card reader, a high-capacity optical storage media reader, a bar code, QR code, or other optical data storage reader, a punch card reader, a Braille reader, a contactless card reader, a proximity mobile payments reader that enables communication with smart phone devices, a contactless proximity card reader that processes secure smart ticketing and electronic payments using contactless secure mobile commerce technology, or any other device or system which retrieves information stored on or in a payment card or its functional equivalent. The device may include one or more network connectivity modules for communication using wired, wireless, near-field communications (NFC), other electromagnetic, fiber optic, other optical, or other communication means and/or protocols, including but not limited to Wi-Fi, 802.1 (x)(y) compliant methods, Bluetooth™, infrared, optical, radio frequency, CDMA, GSM, GPRS, and satellite. The network communication modules may include one or more ports enabled and associated with the network communication modules. Network connectivity may be achieved by the device via any one or combination of several communication modules and communication modes based on operational situations. For example, the device may communicate via a wired network using the appropriate wired communication module while the device is placed in a wired connectivity cradle equipped with access to a wired network and the appropriate connector(s) to operatively communicate with a wired communication module port. When the device is removed from the wired connectivity cradle, the device may be switched from a wired communication mode to a wireless communication mode via activation and deactivation of the appropriate communication modules. The switch from wired to wireless communication mode may be performed automatically by software or firmware running on the wireless device or performed manually at the direction of a user. Similarly, the wireless device may automatically select or be manually instructed to utilize one of several available communication modules and modes to use based on operational factors such as, but not limited to, availability of service, signal strength, security considerations, available bandwidth, link reliability, and the like by activating desired communication module(s) and deactivating others. The wired connectivity cradle may also comprise a wireless access port operatively connected to the wired network and accessible by a wireless communication module in one or more wireless devices, thereby providing a localized point of network access for one or more wireless devices in a gaming environment within which the electromagnetic spectrum may be highly congested and radio frequency interference is prevalent. The wireless device may comprise a printer and/or a printer port for connection of an external printer or a plurality of printers connected to a plurality of gaming devices via wired, wireless, or other communication means. The wireless device may be powered by alternating current, direct current, battery, stored charge, solar, or any other known power source available at the point of use. Wireless devices powered by stored energy sources may be periodically recharged from other power sources, including but not limited to charging a stored energy source when the wireless device is placed in a special cradle that may provide wired network connectivity as described above in addition to power charging capability.

Additionally, the embedded controller 102 is communicatively coupled to a wireless communication module 110, which is also configured to support secure wireless communication using wireless communication protocols such as Bluetooth, Zigbee, DigiMesh, WiFi and other such wireless communication protocols. In the illustrative embodiment, the wireless protocol is the 802.15.4 wireless protocol. Other illustrative wireless protocols include GSM/GPRS, CDMA, 802.11 and Bluetooth.

The wireless network is a protocol that uses the 802.15.4 standard and adds additional routing and networking functionality. Most notably, the invention adds mesh networking to the underlying 802.15.4 radio. Mesh networking is used in applications where the range between two points may be beyond the range of the two radios located at those points, but intermediate radios are in place that could forward on any messages to and from the desired radios.

Additionally, the software protocol within the radios will take care of retries, acknowledgements and data message routing. Software also has the ability to self-heal the network. Devices in the network specification can forward all messages not intended for that particular device.

The 802.15.4 network was designed for low power and low bandwidth applications. The software protocol may be used for high density locations such as casino gaming floors and public events. In the illustrative embodiment shown in FIG. 1, the illustrative wireless communication module 110 communicates with an aggregator 113.

The illustrative aggregator 113 receives the wireless transmissions and routes them to the backend server over Ethernet. Additionally, the aggregator 113 is configured to transmit the authorization and voucher validation information over the 802.15 wireless network. Furthermore, the data transmitted wirelessly across the network is encrypted with three (3) layers of data security that include tokenization, encryption from the embedded controller 102, and encryption from an alternate mesh protocol such as DIGIMESH™ which is developed by Digi International. DIGIMESH™ provides security using fixed AES-128 encryption that is configurable, but does not change during normal operation. The embedded controller 102 further encrypts the data using AES-128, but with keys that are different across all client device and aggregator pairs and that change at least as often as each financial transaction. The third layer of security is provided by using a Derived Unique Key Per Transaction (DUKPT), which is a key management scheme that generates a unique key for every transaction wherein the unique key is derived from a fixed key.

The illustrative aggregator 113 is located at specific locations to minimize the need for individual radios, which creates the ability for the 802.15.4 network to handle many nearly simultaneous transactions. In operation, a preliminary path check ensures the ability of the network to fully route transactional information to the desired source.

The illustrative 802.15.4 network also supports the encryption that is necessary for processing financial transactions, confidential information and for system monitoring. The 802.15.4 wireless protocol operates at a frequency that is not readily discoverable by patrons.

Additionally, the illustrative network is configured to eliminate the need for user credentials so that each client wireless communication module 110 and aggregator 113 may use a unique AES key that changes before each transaction or after a period of expiration. The illustrative 802.15.4 wireless protocol enables client devices, systems and methods presented herein to use proprietary protocols that makes it difficult and/or cost prohibitive for a third party technology to communicate with a CMS system.

In the illustrative embodiment, the embedded controller 102 does not perform payment functions; rather, the payment functions are initiated by the POS terminal 108. The embedded controller 102 securely transmits the requests from the POS terminal 108. Since the embedded controller 102 does not perform the payment function of generating the EFT request, there is little or no risk of a security breach resulting from the embedded controller 102 initiating a payment transaction. Thus, the embedded controller 102 securely communicates a plurality of transactional data to the backend server 114, in which the transactional data is initiated by the POS terminal 108.

The illustrative backend server 114 receives transaction data from the aggregator 113. The transaction data is transmitted to master gateway 118, which in turn sends allowable transactions on to the banking processor (not shown) and waits for an authorization message. The banking processor then proceeds to either approve or deny the transaction. If the transaction is denied, then information regarding the denial is transmitted back through the aggregator 113, 802.15.4 mesh network and embedded controller 102 and eventually displaying a "transaction not approved" message on the POS Device 108.

If the transaction is approved, the backend server 114 uses a seed algorithm to generate a voucher validation code; this voucher validation code along with the approval information is logged in to the backend 114 database (described in further detail below) and then transmitted back through the aggregator 113, 802.15.4 network and embedded controller 102 eventually displaying a "transaction approved" message on the POS device 108. In conjunction with the approval message on the POS Device 108, the embedded controller 102 signals the printer sharing board 130 that it wishes to print a voucher. As described above, the printer sharing board 130 allows a break in the communication between the EGM 112 and the TITO printer 104. Once there is a break in the communication between the EGM 112 and the TITO printer 104, the shared printer board 130 allows a queued voucher (not shown) to print on the TITO Printer 104.

After the voucher has printed, a confirmation message is sent back through the 802.15.4 network to the aggregator 113 and then to the backend server 114. This message is entered into the backed server database and is also sent to a CMS 124 and a corresponding CMS database 126 to let the CMS database 126 store the voucher code that represents a redeemable voucher, e.g. TITO ticket.

In the illustrative embodiment, the backend server 114 does not communicate directly with the CMS 124. Instead, the backend server 114 is communicatively coupled to a Slot Machine Interface Board (SMIB) 122 using standard Slot Accounting System (SAS) and/or Game to System (G2S) protocols. The SMIB 122 then communicates with the CMS 124 using the manufacturer's proprietary protocols. The resulting system 100 appears to the CMS 124 as a single slot machine (or multiple slot machines if multiple SMIBs are used) that simply prints/issues TITO tickets. The system 100 enables the patron to receive a newly printed voucher that can be inserted into a bill validator (not shown) corresponding to slot machine 112 and an equivalent number of credits will be placed on the game register of the slot machine 112. Alternatively, the patron can also take the printed voucher to a redemption outlet located on the premises.

In this illustrative embodiment, the backend server 114 is also communicatively coupled to a master gateway 118 that includes a "payment gateway," which is also referred to as a banking gateway. For purposes of this patent, the terms "payment gateway" and "banking gateway" are used interchangeably; however, in general the term "banking gateway" refers to the illustrative slot machine embodiment and "payment gateway" refers to the more general embodiment. The payment gateway is configured to communicate with at least one financial network (not shown). Additionally, the payment gateway is configured to receive an authorization request, which is associated with an approved transaction.

A master gateway software module 119 resides in the master gateway 118 and includes proprietary software that communicates with the backend server 114. In the illustrative embodiment, the backend server 114 is communicatively coupled to a banking gateway API using a secure network communication protocol. The master gateway 118 is communicatively coupled to one or more financial networks, including but not limited to the PLUS, STAR, CIRRUS, INTERLINK, MONEY PASS, or NYCE networks, that provide access to the server(s) associated with patrons' financial accounts.

By way of example and not of limitation, the backend server 114 is communicatively coupled to the master gateway 118 using the internet that employs an illustrative security protocol such as HTTPS utilizing SSL/TLS. Other security protocols may also be used. The HTTPS protocol provides authentication and protects the privacy and integrity of the exchanged data.

The master gateway software module 119 includes a payment gateway API that is proprietary to at least one specific payment gateway service. In an alternative embodiment, the master gateway 118 does not include banking gateway software; thus, the master gateway 118 represents an external service associated with, but not controlled by, the transactional system.

In operation, the backend server 114 connects to and exchanges data with the master gateway 118. The transaction is initiated with an outbound EFT request, which is associated with a patron interacting with the POS terminal 108. Applicable data is forwarded from the terminal 108 to the embedded controller 102, which is then sent to the master gateway 118 via backend server 114 and then to the appropriate financial network associated with the institution or other entity that manages and controls the patron's account. The result of the processed EFT request from the institution or entity is conveyed back to the master gateway 118 via the financial network and then back to the embedded controller 102 via backend server 114 for further disposition.

More generally, the master gateway is communicatively coupled to the embedded controller and the backend server 114. The master gateway securely communicates with at least one financial network.

The embedded controller securely communicates the received transactional data to the master gateway using a 802.15.4 network protocol to the aggregator 113, which is communicatively coupled to the backend server 114.

If the transaction is approved, then the master gateway communicates that the transaction is an "authorized transaction" and the backend server 114 generates a TITO ticket serial number. The TITO serial number and authorization information are then passed back through the aggregator 113. The illustrative 802.15.4 network protocol is used from communications between the aggregator 113 and the embedded controller 102. The embedded controller 102 then sends the approval message to the POS device 108.

Additionally, when the POS device 108 receives the approval message, the printer connection 120 is broken between the slot machine (EGM) 112 and the printer 104, which allows a voucher to be printed by the printer 104. The voucher validation number is generated by the backend server 114 and a voucher validation number is communicated to the embedded controller 102, which then proceeds to instruct the printer 104 to print the voucher and or receipt The embedded controller 102 then wirelessly communicates that the TITO ticket serial number has been printed to the aggregator 113, which then communicates that the TITO ticket serial number has been printed to the backend server 114.

The backend server 114 then proceeds to communicate through a Slot Machine Interface Board (SMIB) 122 and enters the TITO serial number into a Casino Management System (CMS) 124 that includes a database module 126. The SMIB 122 allows the backend server 114 to communicate with the CMS 124 using standard slot accounting protocols such as G2S and/or SAS.

The CMS 124 then communicates through the SMIB 122 to let the backend server 114 know that the ticket has been successfully logged. The CMS 124 manages the accounting and monitoring system for a casino.

Presently each slot machine, player tracking, or progressive gaming apparatus at a table game is connected to the CMS through wired connections. The client devices, systems and methods presented herein eliminate the need for wiring each individual device, which can be extremely cost prohibitive. More specifically, the illustrative systems and methods substantially reduce the number of wired devices from the thousands to a few dozen aggregators 113.

In yet another embodiment, the master gateway also acts as a gaming regulatory gateway and adheres to limits, rules and standards that are set forth in accordance with specific gaming jurisdictions. The master gateway may or may not handle rules and limits for more than one instance of the product simultaneously, such as handling rules of jurisdiction one for site one and rules of jurisdiction two for site two.

The master gateway makes initial determinations based on these limits, rules and standards about whether a transaction should be processed and sent on to the financial network or rejected without being sent.

The master gateway also has the ability to apply business based logic rules to initiated transactions. These parameters will determine the optimal transaction routing through the payment networks and can also determine whether or not to deny transactions based on pre-determined criteria.

Figure 2:
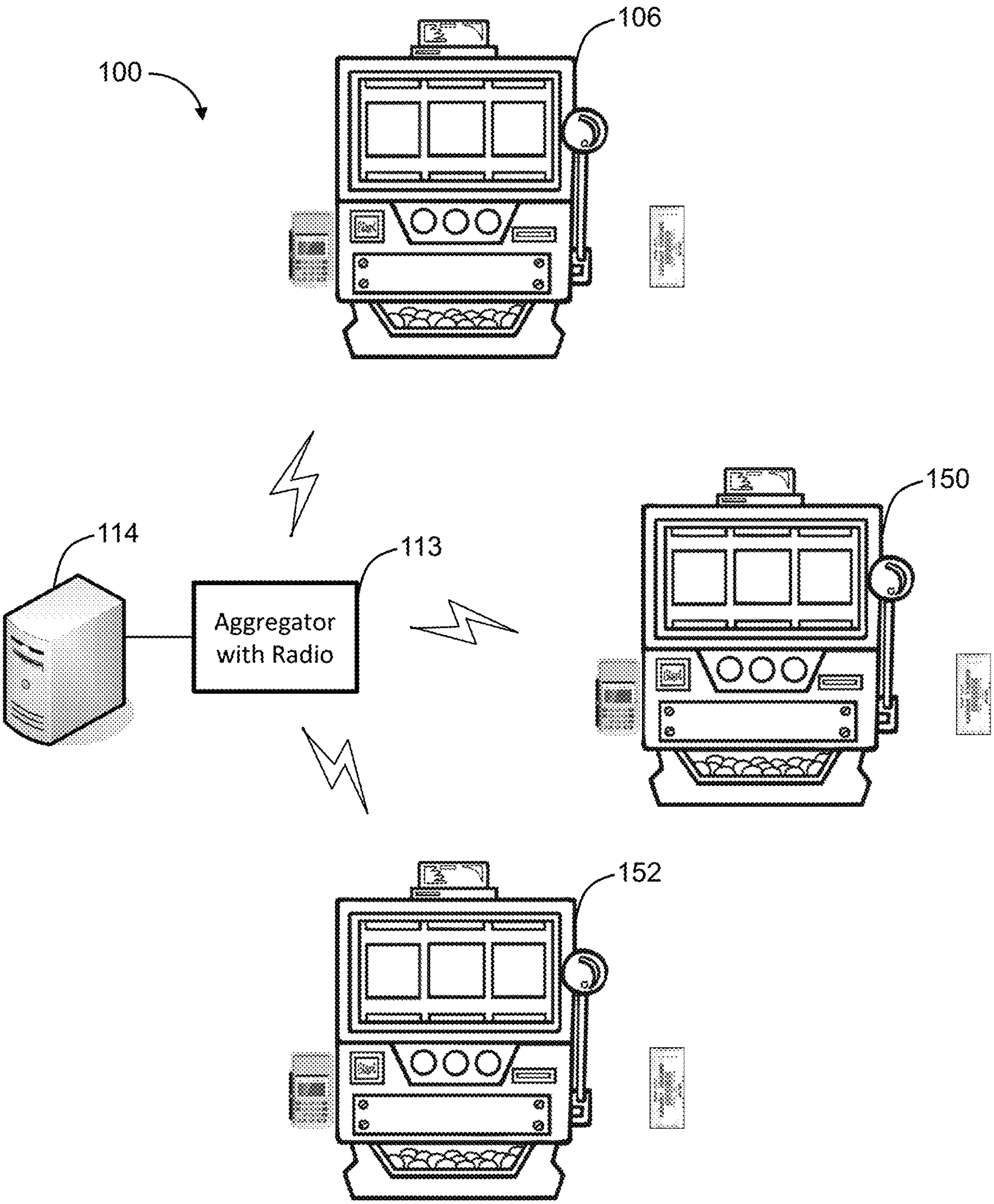
FIG. 2 shows a backend server communicating with a plurality of different EGMs.

Referring to FIG. 2, there is shown a plurality of client devices communicatively coupled to the backend server. The client devices 106, 150 and 152 are wirelessly coupled to the aggregator radio 113. Each of the client device includes a wireless communications module similar to wireless communications module 110. The plurality of wireless communications modules enable communications with at least one other wireless communication module over short distances using point to point or broadcast packets that allow for bi-directional data transmission between each client device located on a casino gaming floor. Additionally, the wireless communications module allows each client device to send and receive data through radio transmissions sent from an out of range client device through a series of data rebroadcasts from at least one wireless communications module that is communicatively coupled to each out of range client device.

Figure 3:
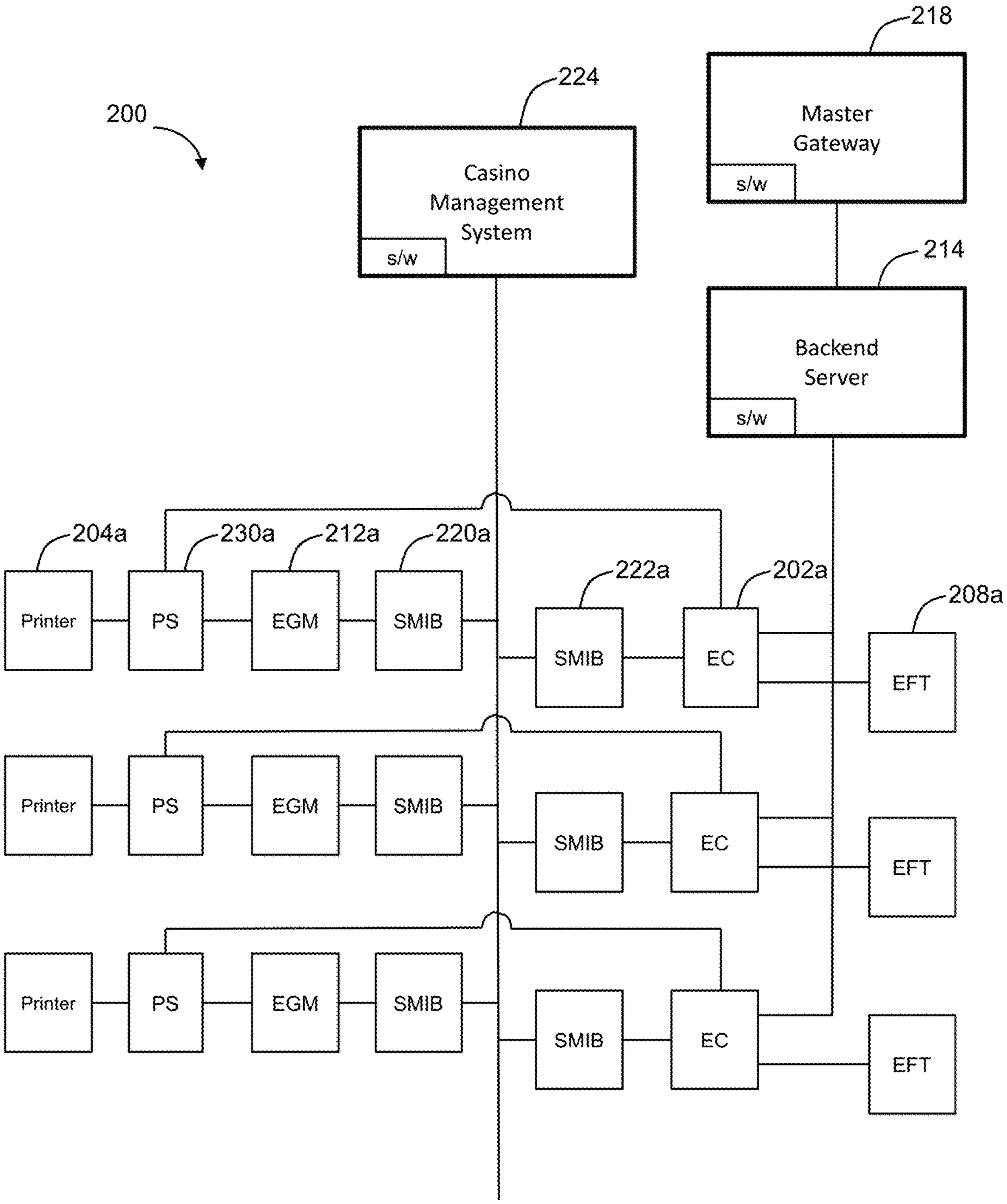
FIG. 3 shows another illustrative transactional system.

Referring to FIG. 3, there is shown another illustrative embodiment that operates similarly to the systems described above. In this illustrative embodiment each embedded controller includes a SMIB that is communicatively coupled to the CMS. The embedded controller 202*a* is electrically coupled to the POS device 208*a*, the printer sharing board 230*a* and SMIB 222*a*. Additionally, the embedded controller 202*a* is communicatively coupled to the backend server 214 and the master gateway 218 as described above.

The casino management system 224 is communicatively coupled to the EGM 212*a* and printer 204*a* via SMIB 220*a*. Additionally, the CMS 224 is communicatively coupled to the embedded controller 202*a* via SMIB 222*a*. The controller 202*a* operates similarly to controller 102*a* in that the controller is configured to generate a request that is communicated to the printer sharing module that reroutes the communications between the electronic gaming machine and the printer.

Figure 4:
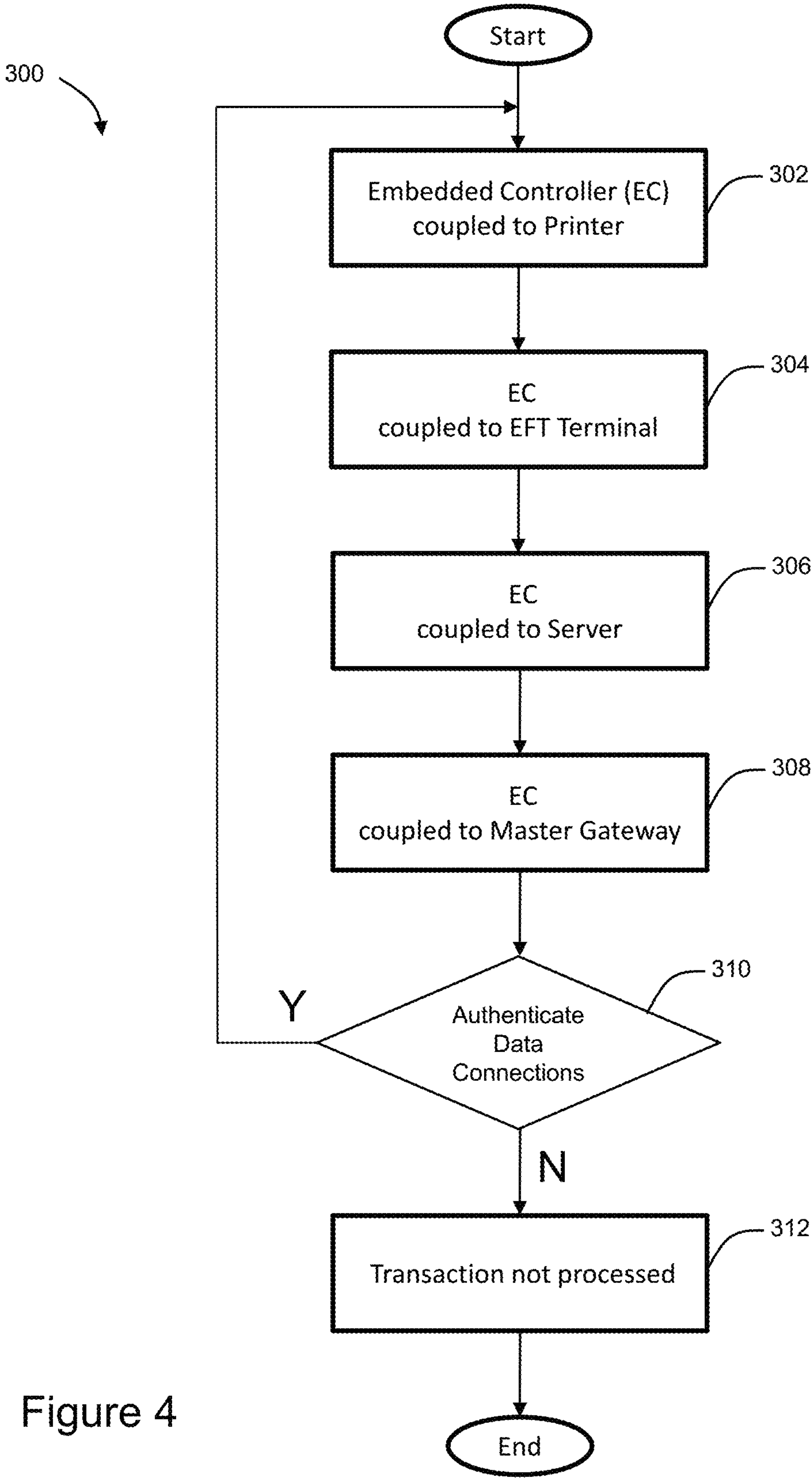
FIG. 4 shows a flowchart of a controller monitoring the data connections with a printer, EFT terminal, server and banking gateway.

Referring to FIG. 4, there is shown a flowchart 300, in which the embedded controller 102 is establishing and monitoring the data connections with the printer, POS terminal, backend server and master gateway.

Custom and proprietary software running on the embedded controller establishes the three secure data connections that include: 1) a secure encrypted connection with the POS terminal, in which the necessary custom and proprietary software is active and configured to begin a new transaction; 2) a secure encrypted connection with master gateway; and 3) a secure encrypted connection with backend server 114. Once all three data connections are established by the embedded controller, the transactional system is considered to be online, active, and accordingly, the illustrative POS terminal is available for a patron to initiate the transactional process.

At block 302, the embedded controller 102 is communicatively coupled to the printer 104. In the illustrative embodiment, the embedded controller 102 and printer 104 communicate via a local communication protocol such as, but not limited to, RS-232, USB(X).(Y), SPI, I2C, RS-422, RS-485, IEEE 1394, or the like. By way of example and not of limitation, a protocol conversion interface or controller board may be utilized between the embedded controller 102 and the dedicated printer 104 to establish a secure data communication path between the two devices utilizing available or desired ports in each one.

At block 304, the embedded controller 102 is communicatively coupled to POS terminal 108. The secure data connection between the embedded controller 102 and the POS terminal 108 is established with at least one security protocol. The secure data connection may be a wired or wireless communication. The wireless connection may be provided with Bluetooth™, 802.1 (x)(y), IR, near-field communication, or any other suitable wired or wireless two-way communication protocol. Security for the data exchanged between the POS terminal 108 and the embedded controller 102 may be obtained via use of any secure encryption protocol such as AES-256, other private key encryption methods, public key infrastructure ("PKI") methods, HTTPS, SSL, TLS, and other such security encryption protocols.

In the illustrative embodiment, there are three security operations performed to manage and control communications between the embedded controller and the POS terminal 108. The at least two security operations also provide device authentication.

One security operation uses encryption to secure the communications between the POS terminal 108 and the embedded controller 102. By way of example and not of limitation, the second security operation uses AES-256 encryption. AES-256 operates using a single private key, which is shared between the POS terminal 108 and the embedded controller 102.

Another security operation uses a proprietary security format. The illustrative proprietary security format may use packet length and a checksum function or checksum algorithm. The illustrative checksum functions are related to hash functions, fingerprints, randomization functions and cryptographic hash functions.

In one illustrative embodiment, the POS terminal 108 sends encrypted data using AES-256 encryption or PCI compliant Derived Unique Key Per Transaction (DUKPT) encryption, including all data containing patrons' PIN information.

At block 306, the embedded controller 102 is communicatively coupled to server 114. The embedded controller 102 is configured to connect to a database or database server, which provides logging, accounting, transactional management and reconciliation services. In the illustrative embodiment, the embedded controller 102 is also communicatively coupled to backend server 114.

At block 308, the embedded controller 102 is communicatively coupled to the master gateway 118. At least one proprietary software application runs on the embedded controller 102. By way of example and not of limitation, the proprietary software applications may include one or more application programming interface(s) required to access the master gateway and financial networks(s) through which EFT requests will be submitted and processed.

The method then proceeds to decision diamond 310, in which the data connections are monitored and authenticated. More specifically, the embedded controller 102 and the data connections with the POS terminal 108, the master gateway 118 and the server 114 are constantly monitored. If a disconnection of the data connection is detected, then the transactional system 100 automatically attempts to reconnect.

If any of the connections between the embedded controller 102 and the POS terminal 108, the master gateway 118 and the server 114 are disconnected, then the method proceeds to block 312 and transactions cannot be processed.

The custom and proprietary software running on the embedded controller continually performs a number of background processing functions. For example, at one second intervals, configuration information from the POS terminal, the embedded controller, the printer, and all components and subsystems directly associated with those devices are read from the database server. Such data may include the name of the establishment, transaction fee amounts and the like. If any configuration changes are identified, the custom and proprietary software running on the embedded controller reconfigures any or all such data on the devices. Additionally, the status of the POS terminal is also monitored, and in the event of a connectivity or hardware failure, a connection to a replacement POS terminal may be initiated.

The embedded controller is also configured to perform other background processing functions including monitoring the connection to the database server and reestablishing the connection if required. The embedded controller also requests the status of the dedicated printer over the appropriate connection port, such as RS-232, to determine such factors as whether the printer is online or offline, the availability of sufficient paper in the printer, the presence of any paper jams or other adverse mechanical conditions, and the like. Additionally, the embedded controller monitors the connection to the POS terminal by polling the POS terminal. If no reply is received within a predetermined time, then the POS terminal is either not present or not functional. Furthermore, the embedded controller monitors the transaction database table resident on backend server 114 for transactions that need to have a printed record operating as indicia of value, such as tickets, or patron receipts reprinted. Further still, the embedded controller waits for transaction initiation requests from the POS terminal.

Figure 5A:
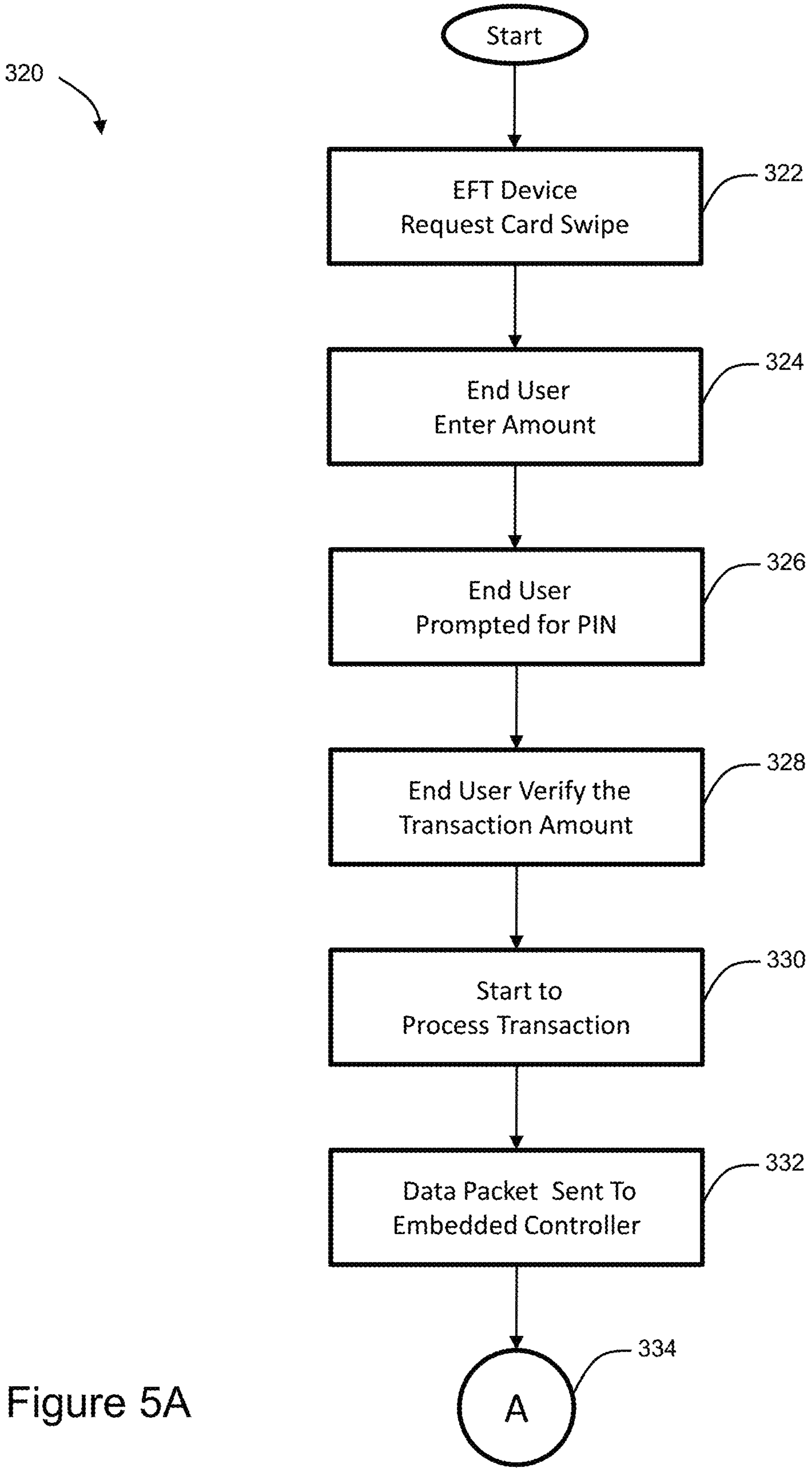
FIGS. 5A-5C show a flowchart of the steps for processing a transaction using the transactional system.

Referring to FIG. 5A, there is shown a flowchart of a method 320 for initiating a transaction with the POS terminal 108. The method is initiated at block 322 when the end user, e.g. casino patron, interacts with the POS terminal 108 with an electrically encoded card. By way of example and not of limitation, the electrically encoded card is a magnetically-encoded card, e.g. a debit card.

In the illustrative embodiment, the end user obtains funds by swiping the user's electrically encoded card, which is associated with the user's banking account, and enters information necessary to authenticate, define, and accept any associated terms of the transaction. The term "electrically encoded card" refers to any card or physical token that can be electrically encoded such as a smart cards, chip-based cards, mobile payment systems (e.g. Apple Play) that include a mobile device such as a smartphone, a magnetic strip card, and other such electrically encoded card. Note in this patent, the magnetically-encoded card is also interchangeably referred to as a magnetic stripe card or "mag stripe" card.

For example, the custom and proprietary software running on POS terminal 108 displays and instructs the illustrative casino patron via an embedded display to the effect "Swipe Card to Begin". After the patron has swiped a card associated with an account which he owns or is authorized to access, he is then instructed to "Enter an amount."

Other technologies may be used in a manner similar to the electrically encoded card to initiate a transaction that transfers funds. For example, transactional smart card(s), RFID tag(s), secure electronic memories, near-field communications, optical media, multi-factor authentication, X.509 certificate authentication, physical biometric data, behavioral biometric data, character or pattern recognition data, alphanumeric login/password authentication, and the like may be used in lieu of the electrically encoded card. These illustrative examples are intended to be representative of the flexibility of the system disclosed herein and are not limiting in any way. It is envisioned that new and improved systems and methods of electronic commerce identification and authentication may be adapted or integrated with the transactional system and method presented herein.

The method then proceeds to block 324 where the end user, e.g. casino patron, enters the amount to withdraw. By way of example and not of limitation, the amount is checked by the POS terminal software for validity (too low, too high, zero), and if the requested amount is acceptable, the patron is then prompted to enter the PIN associated with the chosen account. The PIN data is received directly by the secure PCI-compliant software embedded in POS terminal 108 and is immediately secured via DUKPT encryption. In the illustrative embodiment, no other software or applications running on the POS terminal are granted access to the illustrative patron's encrypted PIN data.

At block 326, the end user is prompted for a Personal Identification Number (PIN), which is typically associated with a debit card. The method then proceeds to block 328, where the end user verifies the transaction amount, the processing fee, convenience fee or other such fee associated with the transaction. The amount or rate of the fee may be shown to the patron in advance to comply with regulatory requirements pertaining to consumer financial transactions.

For example, following the successful receipt and encryption of the PIN data, the transaction fee is calculated by the custom and proprietary software running on POS terminal based on data obtained from an SQL database resident on the illustrative database server. In this illustrative embodiment, the transaction fee is comprised of two components: 1) a fixed fee amount, and 2) a fee percentage. Both amounts are calculated based on the requested amount of the transaction amount and added together; fractional cents are always rounded down.

After the end user accepts the transaction and associated fee the method proceeds to block 330 where the transaction is processed.

In the illustrative embodiment presented herein, the POS terminal 108 is a portable or fixed device provided to a patron to initiate and direct the processing of an illustrative debit transaction. Alternatively, the POS terminal may be a mobile phone, a smartphone, a personal digital assistant (PDA), a payment module, a portable computer, a personal computer, a server, or any other suitable computing circuit or device.

At block 332, an appropriate data packet corresponding to the transaction is generated by the POS terminal. The data packet is then communicated from the POS terminal 108 to the embedded controller 102 using a security communications protocol as described previously.

The method for initiating a transaction permits end users, e.g. casino patrons, to draw funds electronically from a financial account which they own or are authorized to access, provided that the account has been enabled to permit such transactions. Typically, customers of financial institutions that include but are not limited to banks, savings and loan associations, credit unions, and the like may obtain a debit card linked to one or more of their financial account(s) with said institution that are linked to the Visa or MasterCard authorization network, and provide direct debit capability from the account(s). Financial institutions and a multitude of other entities also issue credit cards to their customers, including but not limited to MasterCard, Visa, Discover, American Express, and the like, that are linked to a credit account in the name of the customer. Subject to the specific limitations of each such account, customers may draw funds on the account. Similarly, patrons may own one or more financial accounts managed or administered by a non-financial institution third party service. Such non-financial institution third party services may include, but are not limited to, PayPal, Amazon Payments, Google Wallet, WePay, Skrill, ProPay, and the like. All of the accounts and services named above, and any similar thereto, are envisioned and may be utilized herewith. The transactional system and method presented herein may transfer funds from any account which permits such transfer via an electronic system or method provided that the patron has properly and independently established such ability in accordance with the requirements of the account administrator(s) in advance.

Figure 5B:
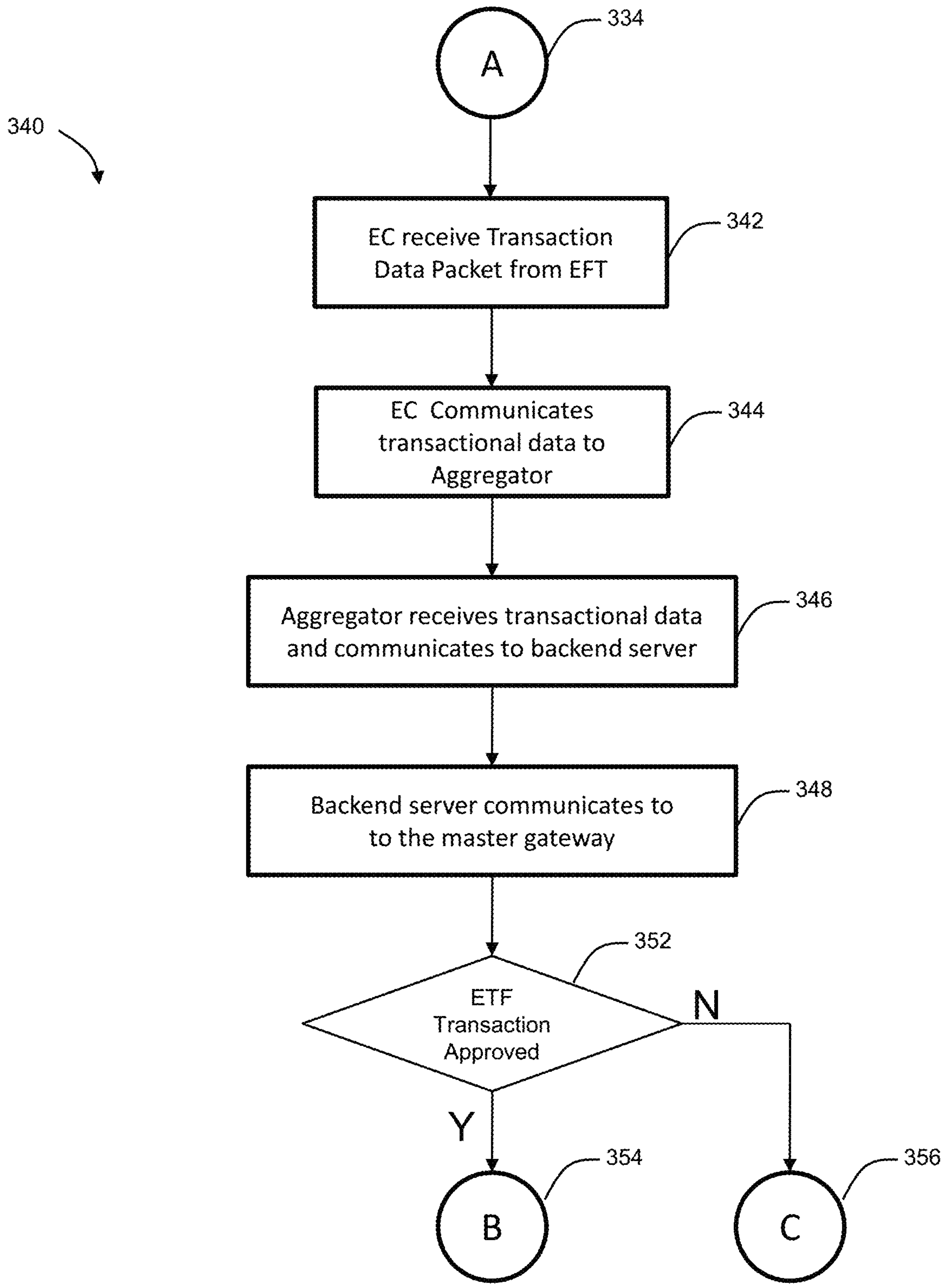

Referring to FIG. 5B, there is shown a flowchart of the operations performed by the embedded controller after the end user has initiated a transaction with the POS terminal 108. At block 342, the embedded controller 102 receives the transaction data packet from the illustrative POS terminal 108. The method then proceeds to block 344 where the embedded controller 102 validates the transaction and a transaction object is created that is communicated from the POS terminal 108 to the aggregator 113 as described above.

At block 346, the aggregator 113 receives the transactional data and communicates the transactional data to the backend server 114. The aggregator is communicatively coupled to the wireless communication module and a plurality of separate wireless communications modules. As described in FIG. 2, each separate wireless communication module is associated with a separate client device.

The wireless communications modules enable communications with at least one other wireless communication module over short distances using point to point or broadcast packets that allow for bi-directional data transmission between each client device located on a casino gaming floor. The wireless communication module allows each client device to send and receive data through radio transmissions sent from an out of range client device through a series of data rebroadcasts from at least one wireless communications module that is communicatively coupled to each out of range client device.

The method then proceeds to block 348 where the backend server 114 communicates the transactional data to the master gateway 118.

The POS request is sent to a financial network(s) via a secure data communication connection and the response is received directly from the master gateway on the same network connection which was made as an outgoing connection from the embedded controller. At decision diamond 352, the determination is made whether the master gateway received an approval for the POS transaction. Once the transaction request has been processed, the results of the transaction request are provided to the system from the appropriate financial server via the established interbank and financial networks.

For example, once the response is received from master gateway 118, it will be either an "APPROVED" response or a "DECLINED" response with an associated reason and reason code. Thus, if the transaction is approved, the method proceeds to connector B 354. The steps following connector B 354 are presented in FIG. 5C. And, if the transaction is declined at decision diamond 352, the method proceeds to connector C 356, in which the subsequent steps are also presented in FIG. 5C.

Figure 5C:
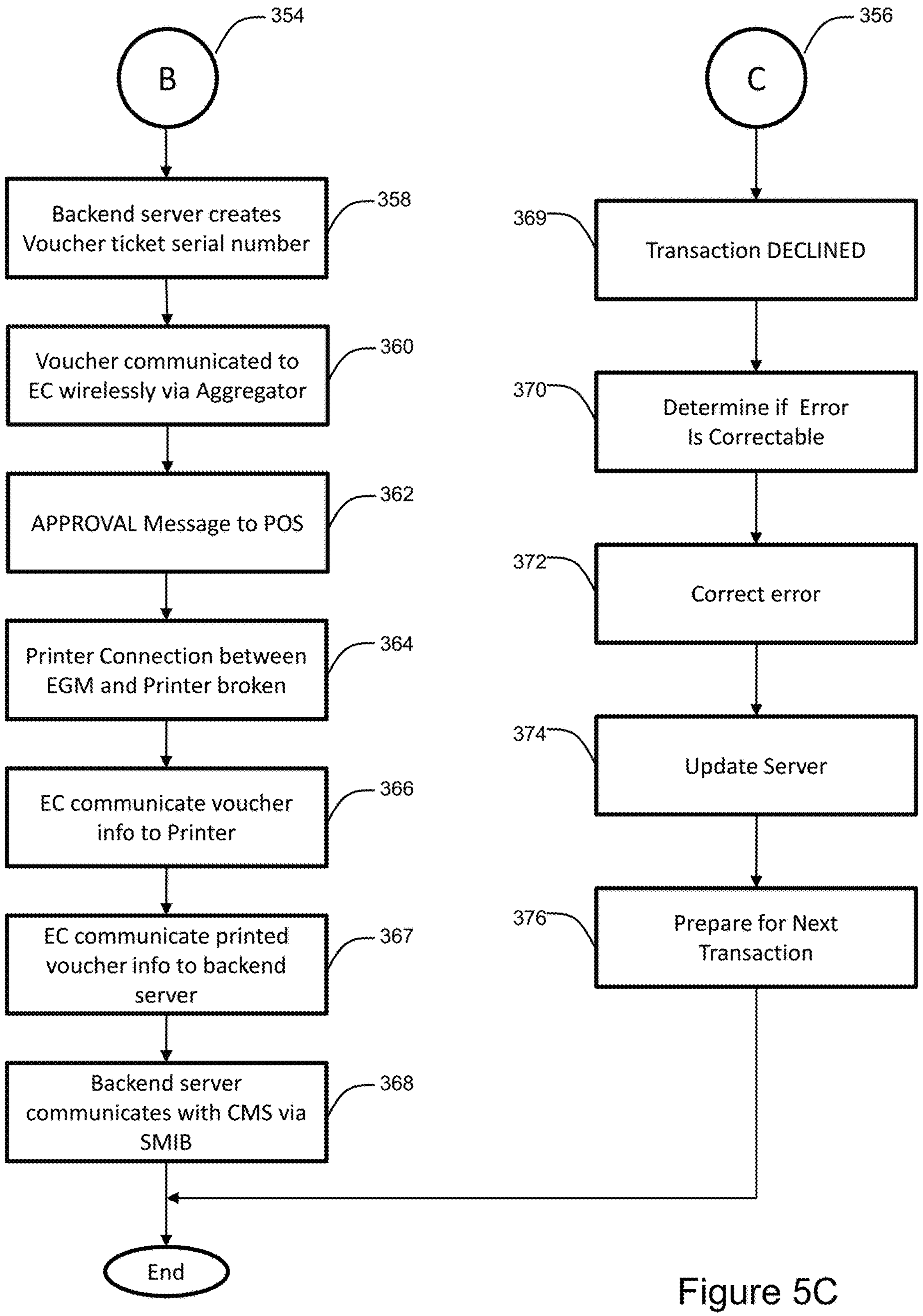

Referring to FIG. 5C, there is shown a flowchart of steps corresponding to accepting and declining the transaction. If the transaction is approved, the transaction record is now passed to block 358 where the backend server generates a voucher ticket serial number and/or a voucher validation code.

At block 360, the illustrative voucher is wirelessly communicated to the embedded controller. In the illustrative embodiment an aggregator is electrically coupled to the backend server. The aggregator is communicatively coupled to the wireless communication module and a plurality of separate wireless communications modules. As described in FIG. 2, each separate wireless communication module is associated with a separate client device.

At block 362, the approved transaction is communicated to the POS device 115.

At block 364, the printer connection of the printer sharing module 130 that includes a logic module that monitors data communications between the electronic gaming processor and the print sharing module 130 is broken.

The method then proceeds to block 366, where the embedded controller 102 reroutes the communications between the electronic gaming machine processor and the printer 104, which allows the controller 102 to communicate with the printer 104. In the illustrative embodiment, the controller 102 communicates to the print sharing module 130 that a voucher associated with the voucher validation code can be printed on the printer 104, when communications between the electronic gaming machine processor and the printer 104 are not detected.

At block 367, the embedded controller 102 communicates the printed voucher information to the backend server 114. More specifically, the controller 102 generates a voucher confirmation message when the voucher is printed. The voucher confirmation message is wirelessly communicated from the controller 102 to the backend server 114.

At block 368, the backend server 114 communicates the voucher validation code from the backend server 114 to the Slot Machine Interface Board (SMIB) that further communicates the voucher validation code to the Casino Management System (CMS) 126, which includes a voucher redemption system.

If the transaction is declined, the method proceeds to connector 356 and the transaction is declined as described at block 369. For example, if the transaction is declined, a data packet is sent to the POS terminal 108 to inform the patron via the embedded LCD display that the transaction was not approved. Additionally, if the transaction has been declined, the patron receives notification of the unsuccessful result and may be prompted to repeat the process, possibly using a different account.

The method then proceeds to block 370, where an examination of the declined transaction is performed. At block 372, the correctible error is corrected. Thus, each transaction record can be examined to determine the error, and then a determination of whether the error can either be automatically or manually corrected is made. For example, the process responsible for printing the patron's receipt via the embedded printer in the POS terminal 108 will continue to retry to print the patron's receipt until the receipt is successfully printed.

At block 374, the illustrative backend server 114 is updated to reflect any errors that have or have not been corrected. By way of example and not of limitation, after the transaction is declined, the appropriate errors or error corrections are reported and all software reverts back to the initial state and waits for the next transaction. The method then proceeds to block 376 where the transactional system is prepared for the next transaction.

The transactional system and method described above may be used at an EGM, e.g. slot machine. The transactional system and method may also be utilized independently of any existing in-house data, communication, or financial network(s), including but not limited to a casino management system ("CMS"). The accounting and financial reconciliation functions of the transactional system and method are configured to be exported to, combined with, or merged into any existing or envisioned CMS provided by the establishment. However, CMS infrastructure is not required to be fully functional. Thus, the transactional system and method may be installed and operated, without the need for a CMS, an Enterprise Resource Planning (ERP) system, or other such back-end systems.

The transactional system and method provides a high level of security. More specifically, the transactional system and method provides a high level of electronic security for the end user's sensitive financial information. Additionally, the transactional system and method enables authorized personnel, e.g. system administrators, to manage and monitor the system remotely using standard computing hardware. Furthermore, the transactional system and method includes modular software and hardware components that support the system functionality with secure software and firmware. Further still, the transactional system and method utilizes secure firmware and software of the various components and sub-systems, and procuring any necessary approvals is greatly simplified when compared with a system utilizing proprietary hardware devices.

The degree of software modularity for the transactional system may easily evolve as well to benefit from the improved performance and anticipated lower cost of the required hardware components.

It is to be understood that the detailed description of illustrative embodiments are provided for illustrative purposes. Thus, the degree of software modularity for the transactional system and method presented above may evolve to benefit from the improved performance and lower cost of the future hardware components that meet the system and method requirements presented. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A gaming system enabling financial transactions for an electronic gaming machine, the gaming system comprising:

an electronic gaming machine processor associated with the electronic gaming machine, wherein the electronic gaming machine includes a controller;

a database including data for the financial transaction request, the database including a financial transaction identification, a cardholder name, and a transaction value; and a financial transaction request transmitted from the controller to a master gateway;

the master gateway including at least one of a problem gaming limit and a gaming rule set;

the master gateway determines whether the financial transaction complies with at least one of the problem gaming limit and the gaming rule set, wherein the master gateway processes a compliant financial transaction request and rejects a non-compliant financial transaction request; and a financial network server that receives the compliant financial transaction request from the master gateway.

2. The gaming system of claim 1 further comprising a Point-of-Sale (POS) terminal communicatively coupled to the controller, wherein the POS terminal receives an amount of monetary funds to transfer from a financial account to the client device and the POS terminal communicates the amount of the monetary funds to the controller.

3. The gaming system of claim 2 further comprising, a wireless communications module communicatively coupled to the controller;

an aggregator communicatively coupled to the wireless communications module and a plurality of separate wireless communications modules, in which each separate wireless communications module is associated with a separate client device;

a backend server communicatively coupled to the aggregator; and wherein the wireless communications module communicates the amount of monetary funds to the backend server.

4. The gaming system of claim 3 wherein the plurality of wireless communications modules, enable communications with at least one other wireless communication module over short distances using point to point or broadcast packets that allow for bi-directional data transmission between each client device located on a casino gaming floor; and allow each client device to send and receive data through radio transmissions sent from an out of range client device through a series of data rebroadcasts from at least one wireless communications module that is communicatively coupled to each out of range client device.

5. The gaming system of claim 1 wherein the master gateway includes at least one of a tribal rule, a state gambling rule, a federal gaming rule, and a casino property rule.

6. The gaming system of claim 3 further comprising a backend server that receives an approved transaction instruction;

at least one of the backend server and a casino management system provides a voucher validation code; and the backend server wirelessly communicates the voucher validation code to the controller.

7. The gaming system of claim 6 wherein the master gateway determines that the financial transaction request complies with at least one of the problem gaming limit and the gaming rule set.

8. The gaming system of claim 6 further comprising a casino management system communicatively coupled to the backend server, wherein the casino management system includes a voucher redemption system; and wherein the voucher validation code is communicated from the backend server to the casino management system.

9. A gaming system for a plurality of electronic gaming machines, the gaming system comprising:

a plurality of electronic gaming machine processors, in which each electronic gaming processor is associate with an electronic gaming machine, wherein each gaming machine includes a controller;

a database including data for each financial transaction request, the database including a financial transaction identification, a cardholder name, and a transaction value;

a plurality of financial transaction requests transmitted from the controllers to a master gateway;

the master gateway including at least one of a problem gaming limit and a gaming rule set;

the master gateway determines whether each financial transaction request complies with at least one of the problem gaming limit and the gaming rule set, wherein the master gateway processes compliant financial transaction requests and rejects non-compliant financial transaction requests; and a financial network server that receives the compliant financial transaction requests from the master gateway.

10. The gaming system of claim 9 further comprising a Point-of-Sale (POS) terminal corresponding to each electronic gaming machine processor of the plurality of electronic gaming machine processors, wherein each POS terminal is communicatively coupled to one controller, wherein a first POS terminal of the plurality of POS terminals receives an amount of monetary funds to transfer from a financial account to a client device and the first POS terminal communicates the amount of monetary funds to a first controller.

11. The gaming system of claim 9 wherein the master gateway includes at least one of a tribal rule, a state gambling rule, a federal gaming rule, and a casino property rule.

12. The gaming system of claim 10 wherein the backend server receives an approved transaction instruction;

at least one of the backend server and a casino management system provides a voucher validation code; and the backend server wirelessly communicates the voucher validation code to the first controller, wherein the first controller is disposed on the client device.

13. The gaming system of claim 12 wherein the casino management system is communicatively coupled to the backend server, wherein the casino management system includes a voucher redemption system; and wherein the voucher validation code is communicated from the backend server to the casino management system.

14. The gaming system of claim 10 wherein each controller and corresponding electronic gaming machine processor is housed in a slot cabinet.

15. The gaming system of claim 10 further comprising:

a wireless communications module communicatively coupled to the controller;

an aggregator communicatively coupled to the wireless communications module and a plurality of separate wireless communications modules, in which each separate wireless communications module is associated with a separate client device;

a backend server communicatively coupled to the aggregator; and wherein the wireless communications module communicates the amount of monetary funds to the backend server.

16. The gaming system of claim 15 wherein the plurality of wireless communications modules enables communications with at least one other wireless communication module over short distances using point to point or broadcast packets that allow for bi-directional data transmission between each client device located on a casino gaming floor; and wherein the plurality of wireless communications modules allows each client device to send and receive data through radio transmissions sent from an out of range client device through a series of data rebroadcasts from at least one wireless communications module that is communicatively coupled to each out of range client device.

* * * * *